United States Patent
Burchard

(10) Patent No.: US 11,353,833 B2
(45) Date of Patent: Jun. 7, 2022

(54) SYSTEMS AND METHODS FOR LEARNING AND PREDICTING TIME-SERIES DATA USING DEEP MULTIPLICATIVE NETWORKS

(71) Applicant: Goldman Sachs & Co. LLC, New York, NY (US)

(72) Inventor: Paul Burchard, Jersey City, NJ (US)

(73) Assignee: Goldman Sachs & Co. LLC, New York, NY (US)

( * ) Notice: Subject to any disclaimer, the term of this patent is extended or adjusted under 35 U.S.C. 154(b) by 1202 days.

(21) Appl. No.: 15/681,942

(22) Filed: Aug. 21, 2017

(65) Prior Publication Data

US 2018/0039239 A1   Feb. 8, 2018

Related U.S. Application Data

(63) Continuation-in-part of application No. 15/666,379, filed on Aug. 1, 2017, now Pat. No. 10,839,316.
(Continued)

(51) Int. Cl.
*G06N 3/08*   (2006.01)
*G06N 20/00*   (2019.01)
(Continued)

(52) U.S. Cl.
CPC ........ *G05B 13/048* (2013.01); *G05B 13/027* (2013.01); *G06N 3/0445* (2013.01);
(Continued)

(58) Field of Classification Search
CPC .................. G06N 20/00; G06N 3/08
See application file for complete search history.

(56) References Cited

U.S. PATENT DOCUMENTS 5,040,214 A   8/1991   Grossberg et al.
5,761,386 A   6/1998   Lawrence et al.
(Continued)

OTHER PUBLICATIONS

Riemens, J. M. "Using convolutional autoencoders to improve classification performance." (2015) [Retrieved Nov. 2020] <URL: https://theses.ubn.ru.nl/handle/123456789/261> (Year: 2015).*
(Continued)

*Primary Examiner* — Ann J Lo
*Assistant Examiner* — Fen Christopher Tamulonis

(57) ABSTRACT

A method includes using a computational network to learn and predict time-series data. The computational network includes one or more layers, each having an encoder and a decoder. The encoder of each layer multiplicatively combines (i) current feed-forward information from a lower layer or a computational network input and (ii) past feedback information from a higher layer or that layer. The encoder of each layer generates current feed-forward information for the higher layer or that layer. The decoder of each layer multiplicatively combines (i) current feedback information from the higher layer or that layer and (ii) at least one of the current feed-forward information from the lower layer or the computational network input or past feed-forward information from the lower layer or the computational network input. The decoder of each layer generates current feedback information for the lower layer or a computational network output.

24 Claims, 3 Drawing Sheets

Related U.S. Application Data

(60) Provisional application No. 62/382,774, filed on Sep. 1, 2016, provisional application No. 62/372,206, filed on Aug. 8, 2016.

(51) Int. Cl.
　　G06N 3/04　　(2006.01)
　　G05B 13/04　　(2006.01)
　　G05B 13/02　　(2006.01)

(52) U.S. Cl.
　　CPC ............ G06N 3/0454 (2013.01); G06N 3/08 (2013.01); G06N 3/084 (2013.01); G06N 20/00 (2019.01)

(56) References Cited

U.S. PATENT DOCUMENTS

| | | | |
|---|---|---|---|
| 6,125,105 | A | 9/2000 | Edwards et al. |
| 8,874,496 | B2 * | 10/2014 | Lazar .................. G06N 3/08 706/16 |
| 9,146,546 | B2 | 9/2015 | Sinyavskiy et al. |
| 2007/0265841 | A1 | 11/2007 | Tani et al. |
| 2013/0297541 | A1 | 11/2013 | Piekniewski et al. |
| 2016/0092764 | A1 | 3/2016 | Burchard |
| 2016/0140434 | A1 | 5/2016 | Yilmaz et al. |
| 2016/0232440 | A1 | 8/2016 | Gregor et al. |

OTHER PUBLICATIONS

Noda, Kuniaki, et al. "Multimodal integration learning of robot behavior using deep neural networks." Robotics and Autonomous Systems 62.6 (2014): 721-736. [Retrieved Nov. 2020] <URL: https://www.sciencedirect.com/science/article/pii/S0921889014000396> (Year: 2014).*

Michalski, Vincent et al. "Modeling deep temporal dependencies with recurrent grammar cells""." Advances in neural information processing systems. 2014. [Retrieved Nov. 2020] <URL:https://proceedings.neurips.cc/paper/2014/hash/cd89fef7ffdd490db800357f47722b20-Abstract.html> (Year: 2014).*

H. Liu et al. "Feature Extraction and Pattern Recognition for Human Motion by a Deep Sparse Autoencoder," 2014 IEEE ICCIT, Xi'an, 2014, pp. 173-181, doi: 10.1109/CIT.2014.144. [Retrieved Nov. 2020] <URL:https://ieeexplore.ieee.org/abstract/document/6984650> (Year: 2014).*

Soltani, Rohollah et al. "Higher Order Recurrent Neural Networks" arxiv [Published Apr. 2016] [Retrieved Nov. 2020] <URL: https://arxiv.org/abs/1605.00064> (Year: 2016).*

Unnamed; "definition of delay" Merriam-Webster Dictionary. <URL: https://www.merriam-webster.com/dictionary/delay> (Year: 2021).*

Vertechi, Pietro, Wieland Brendel, and Christian K. Machens. "Unsupervised learning of an efficient short-term memory network." NIPS. 2014. (Year: 2014).*

Häusler, Chris, and Alex Susemihl. "Temporal autoencoding restricted boltzmann machine." arXiv preprint arXiv: 1210.8353 (2012) (Year: 2012).*

W. Shane Grant et al., "Biologically plausible learning in neural networks with modulatory feedback", Neural Networks, 88, Jan. 28, 2017, p. 32-48.

Erol Egrioglu et al., "Recurrent Multiplicative Neuron Model Artificial Neural Network for Non-Linear Time Series Forecasting", 2nd World Conference On Business, Economics And Management— WCBEM 2013, Procedia—Social and Behavioral Sciences, 109, Jan. 28, 2014, p. 1094-1100.

Jurgen Schmidhuber, "Deep Learning in Neural Networks: An Overview", Oct. 8, 2014, 88 pages.

Ozan Irsoy & Claire Cardie, Modeling Compositionality With Multiplicative Recurrent Neural Networks, May 2, 2015, 10 pages.

Marijn F. Stollenga et al., "Deep Networks with Internal Selective Attention through Feedback Connections", Jul. 11, 2014, 9 pages.

Ilya Sutskever et ai., "Generating Text with Recurrent Neural Networks", Jan. 2011, 8 pages.

Emilio Salinas et al., "A model of multiplicative neural responses in parietal cortex", Proc. Natl. Acad. Sci., vol. 93, Oct. 1996, p. 11956-11961.

Michael Schmitt, "On the Complexity of Computing and Learning with Multiplicative Neural Networks", Feb. 1, 2002, 63 pages.

Paul Burchard, "Systems and Methods for Learning and Predicting Time-Series Data Using Inertial Auto-Encoders", U.S. Appl. No. 15/666,379, filed Aug. 1, 2017.

Socher et al.; "Recursive Deep Models for Semantic Compositionality Over a Sentiment Treebank"; Conference on Empirical Methods in Natural Language 2013; Seattle, Washington, USA; Oct. 18-21, 2013; 12 pages.

Broomhead et al., "Radial Basis Functions, Multi-Variable Functional Interpolation and Adaptive Networks," Royal Signals & Radar Establishment Malvern (United Kingdom), RSRE Memorandum No. 4148, Publication (online) Mar. 28, 1988, Retrieved Sep. 26, 2017 from <http://www.dtic.mil/get-tr-doc/pdf?AD= ADA196234?, 39 pages.

Le, "A Tutorial on Deep Learning Part 2: Autoencoders, Convolutional Neural Networks and Recurrent Neural Networks," In: Google Brain, Oct. 20, 2015, retrieved from <http://ai.stanford.edu/~quocle/tutorial2.pdf>, 40 pages.

Prasad et al., "Deep Recurrent Neural Networks for Time-Series Prediction," In: arXiv preprint, Aug. 15, 2014, retrieved from <https://arxiv.org/ftp/arxiv/papers/1407/1407.5949.pdf>, 36 pages.

International Search Report and Written Opinion for International Application No. PCT/US2017/049358, dated Nov. 7, 2017, 9 pages.

International Search Report and Written Opinion for International Application No. PCT/US2017/044963, dated Oct. 18, 2017, 7 pages.

Communication dated May 12, 2020 in connection with European Patent Application No. 17847459.9, 8 pages.

Communication pursuant to Rules 70(2) and 70a(2) EPC dated Jun. 3, 2020 in connection with European Patent Application No. 17847459.9, 1 page.

Chung et al., "Gated Feedback Recurrent Neural Networks", Dept. IRO, Universite de Montreal, Jun. 2015, 9 pages.

Supplementary European Search Report dated Mar. 4, 2020 in connection with European Patent Application No. 17 84 0029.7, 8 pages.

Examination Report dated Apr. 28, 2021 in connection with Australian Patent Application No. 2017321524, 4 pages.

* cited by examiner

SYSTEMS AND METHODS FOR LEARNING AND PREDICTING TIME-SERIES DATA USING DEEP MULTIPLICATIVE NETWORKS

CROSS-REFERENCE TO RELATED APPLICATIONS AND PRIORITY CLAIM

This application claims priority under 35 U.S.C. § 119(e) to U.S. Provisional Patent Application No. 62/382,774 filed on Sep. 1, 2016. This provisional application is hereby incorporated by reference in its entirety.

This application also claims priority as a continuation-in-part of U.S. patent application Ser. No. 15/666,379 filed on Aug. 1, 2017, which claims priority under 35 U.S.C. § 119(e) to U.S. Provisional Patent Application No. 62/372,206 filed on Aug. 8, 2016. Both of these applications are hereby incorporated by reference in their entirety.

TECHNICAL FIELD

This disclosure relates generally to machine learning and data prediction. More specifically, this disclosure relates to systems and methods for learning and predicting time-series data using deep multiplicative networks.

BACKGROUND

"Machine learning" generally refers to computing technology that is designed to learn from and perform predictive analysis on data. Neural networks are one example type of machine learning technique based on biological networks, such as the human brain. In neural networks, data processing is performed using artificial neurons, which are coupled together and exchange processed data over various communication links. The "learning" aspect of neural networks can be implemented by altering weights associated with the communication links so that some data is treated as being more important than other data.

A "time series prediction" refers to a prediction made by a machine learning algorithm using time-series data, such as data values that are collected over time via one or more sensory inputs. Time series prediction is an important component of intelligence. For example, an intelligent entity's ability to predict a time series of inputs can allow the intelligent entity to create a model of the world (or some smaller portion thereof).

SUMMARY

This disclosure provides systems and methods for learning and predicting time-series data using deep multiplicative networks.

In a first embodiment, a method includes using a computational network to learn and predict time-series data. The computational network includes one or more layers, and each layer includes an encoder and a decoder. The encoder of each layer multiplicatively combines (i) current feed-forward information from a lower layer or a computational network input and (ii) past feedback information from a higher layer or that layer. The encoder of each layer generates current feed-forward information for the higher layer or that layer. The decoder of each layer multiplicatively combines (i) current feedback information from the higher layer or that layer and (ii) at least one of the current feed-forward information from the lower layer or the computational network input or past feed-forward information from the lower layer or the computational network input. The decoder of each layer generates current feedback information for the lower layer or a computational network output.

In a second embodiment, an apparatus includes at least one processing device and at least one memory storing instructions that, when executed by the at least one processing device, cause the at least one processing device to learn and predict time-series data using a computational network. The computational network includes one or more layers, and each layer includes an encoder and a decoder. The encoder of each layer is configured to multiplicatively combine (i) current feed-forward information from a lower layer or a computational network input and (ii) past feedback information from a higher layer or that layer. The encoder of each layer is configured to generate current feed-forward information for the higher layer or that layer. The decoder of each layer is configured to multiplicatively combine (i) current feedback information from the higher layer or that layer and (ii) at least one of the current feed-forward information from the lower layer or the computational network input or past feed-forward information from the lower layer or the computational network input. The decoder of each layer is configured to generate current feedback information for the lower layer or a computational network output.

In a third embodiment, a non-transitory computer readable medium contains instructions that, when executed by at least one processing device, cause the at least one processing device to learn and predict time-series data using a computational network. The computational network includes one or more layers, and each layer includes an encoder and a decoder. The encoder of each layer is configured to multiplicatively combine (i) current feed-forward information from a lower layer or a computational network input and (ii) past feedback information from a higher layer or that layer. The encoder of each layer is configured to generate current feed-forward information for the higher layer or that layer. The decoder of each layer is configured to multiplicatively combine (i) current feedback information from the higher layer or that layer and (ii) at least one of the current feed-forward information from the lower layer or the computational network input or past feed-forward information from the lower layer or the computational network input. The decoder of each layer is configured to generate current feedback information for the lower layer or a computational network output.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
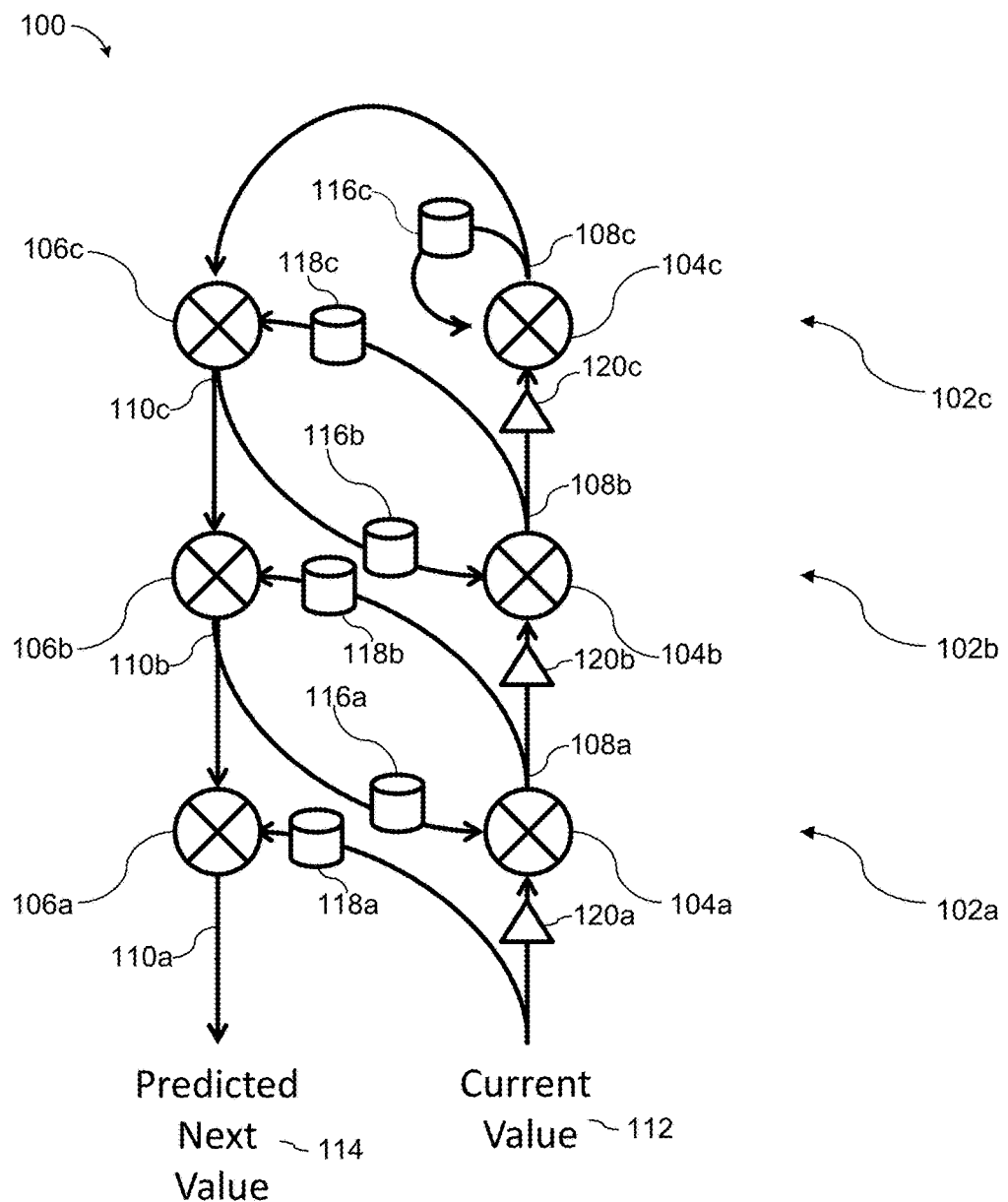
FIG. 1 illustrates an example architecture implementing a deep multiplicative network for learning and predicting time-series data according to this disclosure.
Figure 2:
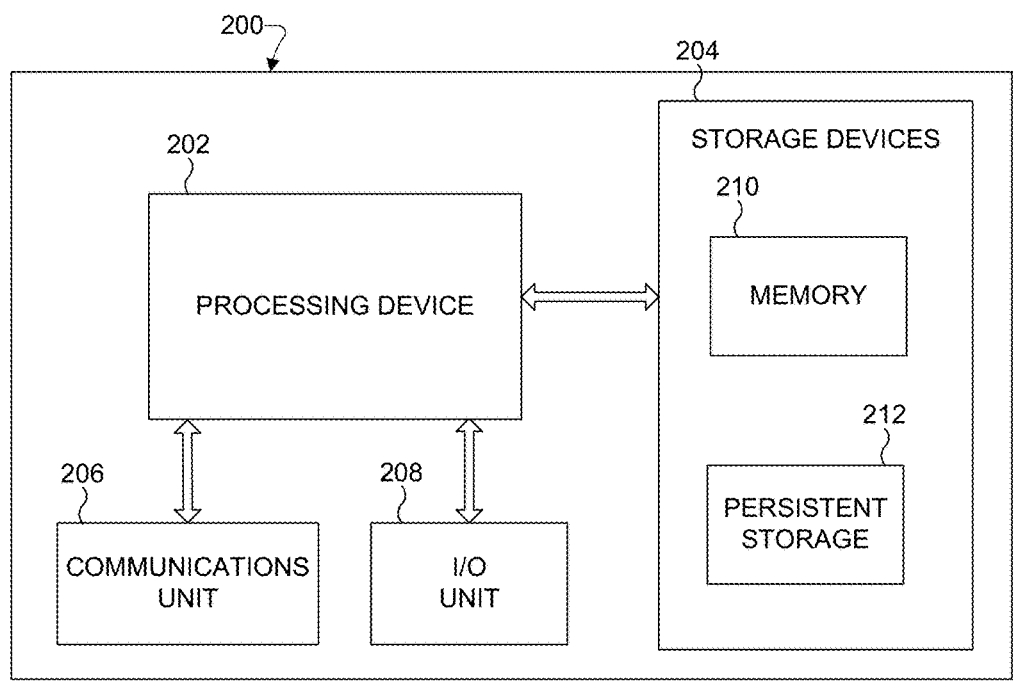
FIG. 2 illustrates an example system for learning and predicting time-series data using deep multiplicative networks according to this disclosure.
Figure 3:
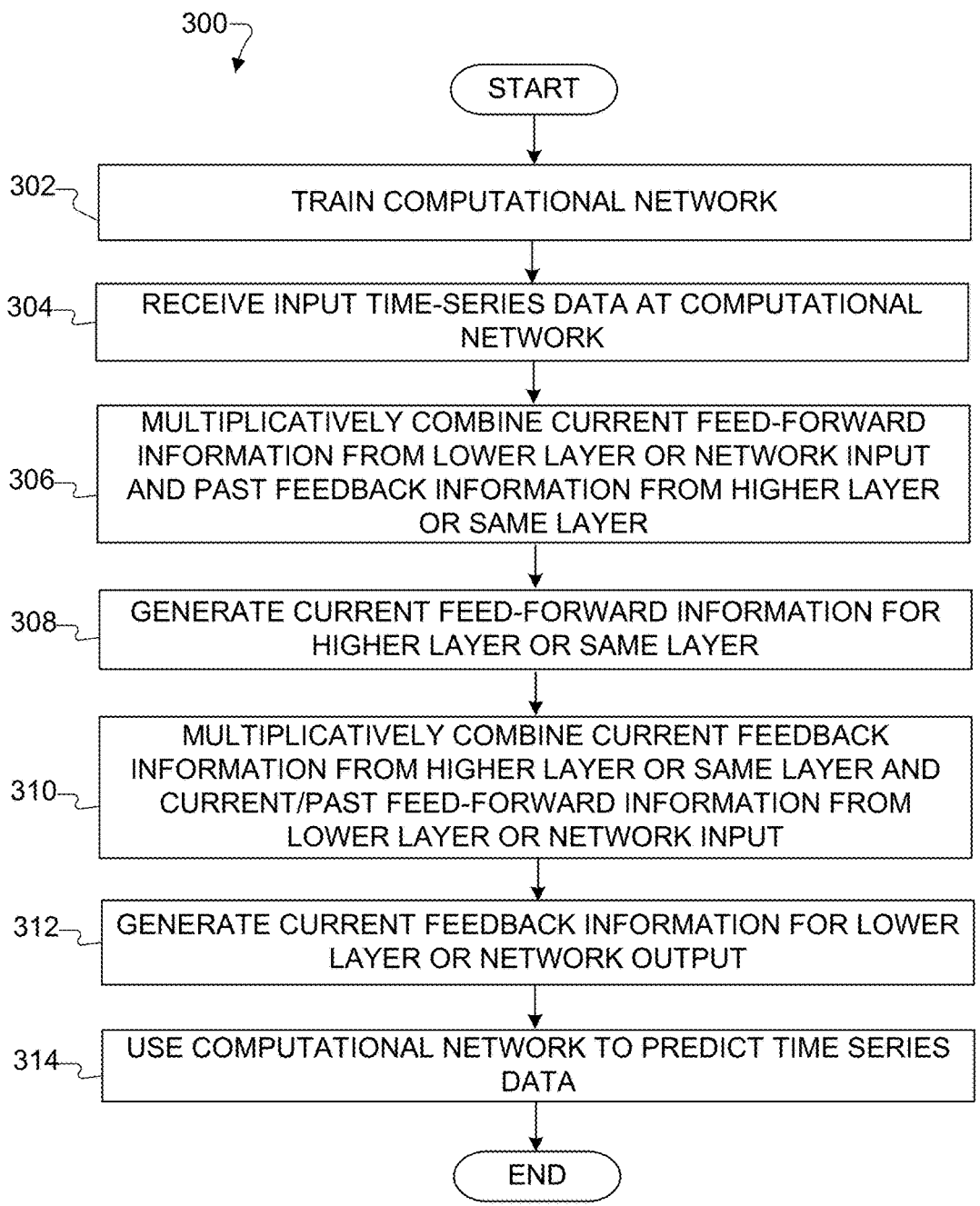
FIG. 3 illustrates an example method for learning and predicting time-series data using deep multiplicative networks according to this disclosure.

FIGS. 1 through 3, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, time series prediction is an important component of intelligence, such as when it allows an intelligent entity (like a person) to create a predictive model of the world around him or her. Motor intent by an intelligent entity may naturally form part of a time series, as well. "Motor intent" generally refers to intended motor movements associated with neural signals, such as moving one's arm or leg or opening/closing one's hand based on different neural signals. Predictions that include past motor intent allow modeling of the effects of that motor intent on the surrounding world. Moreover, if an intelligent entity includes a control system that can compute optimal motor intents relative to some high-level goals for affecting the world, the ability to predict future motor intents can occur more accurately without always having to perform a full optimization, which can provide enormous savings in computations and energy usage. Specific examples of time-series data that can be learned and predicted include natural language (including text or voice) and video.

Time series prediction using neural networks has traditionally been done using pure feed-forward neural networks or shallow recurrent neural networks. A recurrent neural network refers to a neural network where connections between nodes in the network form a "directed cycle" or a closed loop in which no repetitions of nodes and connections are allowed except for the starting and ending node (which represent the same node). More recently, deep recurrent networks using long short-term memory have been devised. While these networks use some multiplicative elements, they are primarily additive in order to make back-propagation feasible.

In one aspect of this disclosure, a device, system, method, and computer readable medium for learning and predicting time-series data are provided. The learning and predicting are accomplished by (i) abstracting high-level information through a multiplicative combination (with optional pooling) of current low-level information and past high-level information and (ii) feeding back future predictions of a time series through a multiplicative combination of predicted future high-level information and current and/or past low-level information. In this approach, a deep recurrent network is formed by combining feed-forward and feedback through multiplicative combination of the high-level and low-level information.

FIG. 1 illustrates an example architecture 100 implementing a deep multiplicative network for learning and predicting time-series data according to this disclosure. As shown in FIG. 1, the architecture 100 includes one or more layers 102a-102c. In this example, the architecture 100 includes three layers 102a-102c, although other numbers of layers could be used in the architecture 100.

The layers 102a-102c include encoders 104a-104c, respectively, and decoders 106a-106c, respectively. The encoders 104a-104c are configured to generate and output feed-forward information 108a-108c, respectively. The encoders 104a-104b in the layers 102a-102b are configured to output the feed-forward information 108a-108b to the next-higher layers 102b-102c. The encoder 104c of the highest layer 102c is configured to output the feed-forward information 108c for use by the highest layer 102c itself (for both feedback and feed-forward purposes).

The decoders 106a-106c are configured to generate and output feedback information 110a-110c, respectively. The decoders 106b-106c in the layers 102b-102c are configured to output the feedback information 110a-110b to the next-lower layers 102a-102b. The decoder 106a of the lowest layer 102a is configured to output the feedback information 110a from the architecture 100.

Feed-forward information is received into the lowest layer 102a of the architecture 100 as inputs 112. A single input 112 represents a current time series value, and multiple inputs 112 represent a sequence of values provided into the lowest layer 102a forming a time series of data. Feedback information is provided from the lowest layer 102a of the architecture 100 as predicted next values 114. A single predicted next value 114 represents a predicted future time series value, and multiple predicted next values 114 represent a sequence of values provided from the lowest layer 102a forming a predicted time series of data. The highest feed-forward (and first feedback) information 108c represents the highest-level encoding of the input time-series data.

The layers 102a-102c also include delay units 116a-116c, respectively, for feedback and optionally delay units 118a-118c, respectively, for feed-forward. The delay units 116a-116c are configured to receive feedback information and to delay that information by one or more units of time. In some embodiments, the delay units 116a-116c may provide different delays of information, such as when the delay(s) for the higher layers is/are longer than the delay(s) for the lower layers. The delayed information is then provided from the delay units 116a-116c to the encoders 104a-104c. The delay units 118a-118c are configured to receive inputs 112 or feed-forward information and to potentially delay that information by zero or more units of time. Again, in some embodiments, the delay units 118a-118c may provide different delays of information, such as when the delay(s) for the higher layers is/are longer than the delay(s) for the lower layers. The (potentially) delayed information is provided from the delay units 118a-118c to the decoders 106a-106c.

The inputs 112 or feed-forward information 108a-108b provided to the encoders 104a-104c may, in some embodiments, be passed through non-linear pooling units 120a-120c, respectively. The pooling units 120a-120c operate to reduce the dimensionality of the data in a manner that increases its transformation-invariance. For example, so-called $l^2$ pooling units can provide invariance to unitary group representations, such as translation and rotation.

Each of the encoders 104a-104c and decoders 106a-106c is configured to multiplicatively combine its inputs. For example, each encoder 104a-104c is configured to multiplicatively combine (i) current (and possibly pooled) feed-forward information from a lower layer or an input 112 and (ii) delayed feedback information from a higher layer (or its own layer at the top) to produce current feed-forward information. The current feed-forward information is then provided to a higher layer (or to that same layer at the top). Each decoder 106a-106c is configured to multiplicatively combine (i) current feedback information from a higher layer (or its own layer at the top) and (ii) current (and possibly delayed) feed-forward information from the lower layer or an input 112 to produce current feedback information. The current feedback information is then provided to a lower layer or as a predicted next value. As shown in FIG. 1, the feed-forward information 108c from the highest layer 102c is fed back to itself, delayed as appropriate by the delay unit 116c.

In some embodiments, the architecture 100 shown in FIG. 1 can be used to implement an auto-encoder. An "auto-encoder" is a type of neural network or other machine learning algorithm that attempts to generate an encoding for a set of data. The encoding denotes a representation of the set of data but with reduced dimensionality. In the ideal case, the encoding allows the auto-encoder to predict future values in time-series data based on initial values in the time-series data. The ability to predict time-series data can find use in a large number of applications.

This can be accomplished by having each decoder 106a-106c multiplicatively combine (i) current feedback information from a higher layer (or its own layer at the top) and (ii) current and past feed-forward information from the lower layer or an input 112. This allows the network to generalize an inertial auto-encoder, which uses an inertial combination of a current feed-forward value, one past feed-forward value, and invariant higher-level feedback.

In general, the network implementing an auto-encoder is generally designed so that its outputs approximately reproduce its inputs. When applied to time-series data, an auto-encoder is "causal" in the sense that only past information is used to reproduce future information. Iteratively, such a causal auto-encoder can reproduce the whole time series from itself, meaning the causal auto-encoder can identify the entire time series based on the time series' initial values. Ideally, the encoding of the inputs 112 by the layers 102a-102c is done so that the final encoded representation of the inputs 112 (the information 108c) is highly constrained (such as sparse). The encoded representation of the inputs 112 can also ideally be used to generate the predicted next values 114, which represent an approximate reproduction of the inputs 112. For time-series data, a causal auto-encoder would approximately reproduce future inputs as the predicted next values 114 based on past inputs 112, allowing the causal auto-encoder to make predictions for the time-series data.

In some embodiments, a causal auto-encoder could be most useful when the ultimate encoding is as high-level and invariant as possible so that the same encoding can be used for many time steps. Invariance can be achieved in FIG. 1 through pooling and/or through multiplicative encoding of the time-series data into an encoding of lower dimensionality. However, to approximately reproduce the original input 112 one time step later (as required of a causal auto-encoder), discarded low-level information needs to be added back into the calculations. In accordance with this understanding, rather than using a pure feed-forward network for an auto-encoder, the feed-forward information 108a-108b can be used to compute a high-level invariant encoding (the information 108c), and the feedback information 110a-110b through the same network can be used to enrich the predicted next value 114 with non-invariant information via use of multiplicative decoding.

Each of the layers 102a-102c includes any suitable structure(s) for encoding data, providing dimensional reduction, or performing any other suitable processing operations. For example, each of the layers 102a-102c could be implemented using hardware or a combination of hardware and software/firmware instructions.

The multiplicative combination in each of the encoders 104a-104c and decoders 106a-106c may take various forms. For example, the multiplicative combination could include a numerical multiplication or a Boolean AND function. The multiplicative combination generally forms part of the transfer function of the encoding or decoding node, which may contain or perform other mathematical operations as well (such as sigmoid damping of an input signal). As a particular example, the multiplicative combination could provide some approximation of a Boolean AND operation, allowing the node to operate as a general-state machine. As a result, the node could check whether an input is x AND a state is y and, if so, determine that the new state should be z.

As with other machine learning systems, the architecture 100 can be trained so that the encoders 104a-104c, decoders 106a-106c, and delay units 116a-116c, 118a-118c function as desired. Deep multiplicative networks have generally been avoided up to this point because it is difficult to train pure feed-forward deep multiplicative networks using standard back-propagation techniques. In some embodiments, the training approach for the architecture 100 (combining feed-forward and feedback units) is to repeatedly apply the following steps given time-series training data. For each time step in the training data, forward-propagate the training data through each encoder 104a-104c and delay unit 116a-116c/118a-118c (the latter constituting forward-propagation in time), and back-propagate the training data through each decoder 106a-106c (updating its non-delayed feedback input 110b-110c/108c). Then, simultaneously across all time steps, update the weights of the encoders 104a-104c and decoders 106a-106c to better reproduce the current training outputs from the current training inputs. If needed, in some embodiments, post-processing could also be performed at each encoder 104a-104c and/or decoder 106a-106c, such as by normalization and/or sparsification of its weights. This results in stable convergence to a locally optimal network.

In other embodiments, the encoders 104a-104c can alternatively be trained using a sparse coding technique as adapted for the recurrent and multiplicative nature of the architecture 100. In this unsupervised procedure, the training involves alternatingly (i) updating the encoder's weights and (ii) updating the encoded states (which are not just outputs but used as inputs for the training due to the recurrence of the architecture 100). In each iteration, the activations of the outputs of the encoder are normalized individually across the training set and in aggregate across each training pair of input and state. All weights of the encoder are then shrunk by a fixed amount. This combination of normalization and shrinking tends to make the weights sparse. Sparseness can be particularly useful for multiplicative networks since the total number of possible weights is very large. Once the encoder has a good representation of the combination of context and input via sparse coding, the associated decoder in that layer can be trained, such as by using a frequency analysis of how these coded states combine with actual future values of the time series. Of course, any other suitable training mechanisms can be used with the components of the architecture 100.

The architecture 100 shown in FIG. 1 can find use in a number of applications. For example, the architecture 100 can be applied to natural language understanding and generation. As a particular example, assume the architecture 100 includes four levels. Through feed-forward, the four layers of the architecture 100 (moving up in the architecture 100) could encode letters into phonemes, encode phonemes into words, encode words into phrases, and encode phrases into sentences. Through feedback, the four layers of the architecture 100 (moving down in the architecture 100) could combine sentence context with current and/or past phrase information to predict the next phrase, combine phrase context with current and/or past word information to predict the next word, combine word context with current and/or past phoneme information to predict the next phoneme, and combine phoneme context with current and/or past letters to predict the next letter. Within the architecture 100, each layer (except the lowest layer 102a) would switch states more slowly than its adjacent lower layer since the information at that layer represents more invariant encoded state. The less invariant information used to predict lower-level information is then fed back into the predictions through the decoders. Both the encoders and decoders, due to their multiplicative nature, can be thought of as "state machines" that represent the grammar of that particular level of abstraction.

Although FIG. 1 illustrates one example of an architecture 100 implementing a deep multiplicative network for learning and predicting time-series data, various changes may be made to FIG. 1. For example, the architecture 100 need not include three layers and could include other numbers of layers in any suitable arrangement (including a single layer).

FIG. 2 illustrates an example system 200 for learning and predicting time-series data using deep multiplicative networks according to this disclosure. As shown in FIG. 2, the system 200 denotes a computing system that includes at least one processing device 202, at least one storage device 204, at least one communications unit 206, and at least one input/output (I/O) unit 208.

The processing device 202 executes instructions that may be loaded into a memory 210. The processing device 202 includes any suitable number(s) and type(s) of processors or other devices in any suitable arrangement. Example types of processing devices 202 include microprocessors, microcontrollers, digital signal processors, field programmable gate arrays, application specific integrated circuits, and discrete circuitry.

The memory device 210 and a persistent storage 212 are examples of storage devices 204, which represent any structure(s) capable of storing and facilitating retrieval of information (such as data, program code, and/or other suitable information on a temporary or permanent basis). The memory device 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 could include a network interface card or a wireless transceiver facilitating communications over a wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

In some embodiments, the instructions executed by the processing device 202 could include instructions that implement the architecture 100 of FIG. 1. For example, the instructions executed by the processing device 202 could include instructions that implement the various encoders, decoders, and delay units shown in FIG. 1, as well as instructions that support the data flows and data exchanges involving these components.

Although FIG. 2 illustrates one example of a system 200 for learning and predicting time-series data using deep multiplicative networks, various changes may be made to FIG. 2. For example, it is assumed here that the architecture 100 of FIG. 1 is implemented using software/firmware that is executed by the processing device 202. However, any suitable hardware-only implementation or any suitable hardware and software/firmware implementation could be used to implement this functionality. Also, computing devices come in a wide variety of configurations, and FIG. 2 does not limit this disclosure to any particular computing device.

FIG. 3 illustrates an example method 300 for learning and predicting time-series data using deep multiplicative networks according to this disclosure. For ease of explanation, the method 300 is described as being implemented using the architecture 100 of FIG. 1 by the device 200 of FIG. 2. Note, however, that the method 300 could be implemented in any other suitable manner.

As shown in FIG. 3, a computational network is trained at step 302. This could include, for example, the processing device 202 of the device 200 receiving training time-series data and providing the data to the architecture 100 of FIG. 1. As noted above, the architecture 100 includes one or more layers 102a-102c, each of which includes a respective encoder 104a-104c and a respective decoder 106a-106c. In some embodiments, the training could occur by repeatedly performing the following operations. Forward-propagate the training data through the encoders 104a-104c and delay units 116a-116c/118a-118c for each time step. Back-propagate the training data through the decoders 106a-106c for each time step. Update the encoders 104a-104c and decoders 106a-106c to better reproduce the training outputs from the training inputs across all time steps. Apply any desired post-processing to the encoders 104a-104c and decoders 106a-106c, such as normalization and/or sparsification.

Input time-series data is received at the computational network at step 304. This could include, for example, the processing device 202 of the device 200 receiving time-series data from any suitable source, such as one or more sensors or other input devices. This could also include the processing device 202 of the device 200 providing the time-series data to the layer 102a of the architecture 100 as inputs 112.

At each layer of the computational network, current feed-forward information from a lower layer or the computational network input is multiplicatively combined with past feedback information from a higher layer or the same layer at step 306. Each encoder thereby generates current feed-forward information for a higher layer or for itself at step 308. This could include, for example, the processing device 202 of the device 200 using the encoder 104a to multiplicatively combine feed-forward information (the inputs 112) with past feedback information from the decoder 106b of the layer 102b. This could also include the processing device 202 of the device 200 using the encoder 104b to multiplicatively combine feed-forward information 108a from the encoder 104a with past feedback information from the decoder 106c of the layer 102c. This could further include the processing device 202 of the device 200 using the encoder 104c to multiplicatively combine feed-forward information 108b from the encoder 104b with past feedback information from itself.

At each layer of the computational network, current feedback information from a higher layer or the same layer is multiplicatively combined with current and/or past feed-forward information from a lower layer or the computational network input at step 310. Each decoder thereby generates current feedback information for a lower layer or for itself at step 312. This could include, for example, the processing device 202 of the device 200 using the decoder 106c to multiplicatively combine feedback information (the information 108c) from the encoder 104c with current/past feed-forward information from the encoder 104b of the layer 102b. This could also include the processing device 202 of the device 200 using the decoder 106b to multiplicatively combine feedback information 110c from the decoder 104c with current/past feed-forward information from the encoder 104a of the layer 102a. This could further include the processing device 202 of the device 200 using the decoder 106a to multiplicatively combine feedback information 110b from the decoder 106b with current/past feed-forward information (the inputs 112).

Note that in steps 306-312, each layer 102a-102b other than the highest layer 102c sends its current feed-forward information to a next-higher layer 102b-102c, and each layer 102b-102c other than the lowest layer 102a sends its current feedback information to the next-lower layer 102a-102b. The highest layer 102c uses its current feed-forward information 108c as its current feedback information, and the lowest layer 102a sends its current feedback information to the computational network output as the predicted next values 114. The current feed-forward information provided to the lowest layer 102a represents a current time-series value, and the current feedback information provided from the lowest layer 102a represents a predicted future time series value. Note that, for each layer 102a-102c, past feedback information can be generated by delaying current feedback information from a higher layer or itself. Also, for each layer 102a-102c, past feed-forward information can be generated by delaying current feed-forward information from a lower layer. In addition, current feed-forward information provided to an encoder 104a-104c could first be passed through a pooling unit 120a-120c to reduce the dimensionality or increase the transformation-invariance of the time-series data.

In this manner, the computational network is used to predict the time-series data at step 314. This could include, for example, the processing device 202 of the device 200 using the computational network to predict the entire sequence of time-series data based on a limited number of inputs 112.

Although FIG. 3 illustrates one example of a method 300 for learning and predicting time-series data using deep multiplicative networks, various changes may be made to FIG. 3. For example, while shown as a series of steps, various steps could overlap, occur in parallel, occur in a different order, or occur any number of times. As a particular example, steps 306-314 could generally overlap with each other.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   using a computational network to learn and predict time-series data, the computational network comprising multiple layers including a highest layer, a lowest layer, and one or more intermediate layers, each of the multiple layers comprising an encoder and a decoder;
   wherein the encoder of each layer other than the highest layer multiplicatively combines (i) current feed-forward information from a lower layer or a computational network input and (ii) past feedback information from a higher layer, the encoder of each layer other than the highest layer generating current feed-forward information for the higher layer; and
   wherein the decoder of each layer other than the lowest layer multiplicatively combines (i) current feedback information from the higher layer and (ii) at least one of the current feed-forward information from the lower layer or the computational network input or past feed-forward information from the lower layer or the computational network input, the decoder of each layer other than the lowest layer generating current feedback information for the lower layer or a computational network output; and for each layer other than the highest layer, generating the past feedback information from the higher layer by receiving the current feedback information from the decoder of the higher layer and delaying the current feedback information for a predetermined amount of time greater than zero before the past feedback information is provided to the encoder of that layer.

2. The method of claim 1, wherein:
each layer other than the highest layer sends its current feed-forward information to a next-higher layer; and
each layer other than the lowest layer sends its current feedback information to a next-lower layer.

3. The method of claim 2, wherein:
the highest layer uses its current feed-forward information as its current feedback information; and
the lowest layer sends its current feedback information to the computational network output.

4. The method of claim 2, wherein:
the current feed-forward information provided to the lowest layer represents a current time series value; and
the current feedback information provided from the lowest layer represents a predicted future time series value.

5. The method of claim 1, further comprising:
for each layer other than the lowest layer, generating the past feed-forward information from the lower layer or the computational network input by delaying the current feed-forward information from the lower layer or the computational network input.

6. The method of claim 1, wherein the current feed-forward information from the lower layer or the computational network input provided to the encoder of each layer is first passed through a pooling unit that reduces a dimensionality or increases a transformation-invariance of the current feed-forward information.

7. The method of claim 1, further comprising:
training the encoder and the decoder of each layer.

8. The method of claim 7, wherein:
the computational network further comprises multiple delay units; and
training the encoder and the decoder of each layer comprises:
forward-propagating training data through the encoders and the delay units for each of multiple time steps;
back-propagating the training data through the decoders for each of the time steps;
updating the encoders and the decoders to improve their reproduction of the training data across the time steps; and
applying post-processing to the encoders and the decoders.

9. An apparatus comprising:
at least one processing device; and
at least one memory storing instructions that, when executed by the at least one processing device, cause the at least one processing device to learn and predict time-series data using a computational network, the computational network comprising multiple layers including a highest layer, a lowest layer, and one or more intermediate layers, each of the multiple layers comprising an encoder and a decoder;
wherein the encoder of each layer other than the highest layer is configured to multiplicatively combine (i) current feed-forward information from a lower layer or a computational network input and (ii) past feedback information from a higher layer, the encoder of each layer other than the highest layer configured to generate current feed-forward information for the higher layer;
wherein the decoder of each layer other than the lowest layer is configured to multiplicatively combine (i) current feedback information from the higher layer and (ii) at least one of the current feed-forward information from the lower layer or the computational network input or past feed-forward information from the lower layer or the computational network input, the decoder of each layer other than the lowest layer configured to generate current feedback information for the lower layer or a computational network output; and
wherein each layer other than the highest layer is configured to receive the current feedback information from the decoder of the higher layer and delay the current feedback information for a predetermined amount of time greater than zero to generate the past feedback information for that layer before the past feedback information is provided to the encoder of that layer.

10. The apparatus of claim 9, wherein:
each layer other than the highest layer is configured to send its current feed-forward information to a next-higher layer; and
each layer other than the lowest layer is configured to send its current feedback information to a next-lower layer.

11. The apparatus of claim 10, wherein:
the highest layer is configured to use its current feed-forward information as its current feedback information; and
the lowest layer is configured to send its current feedback information to the computational network output.

12. The apparatus of claim 10, wherein:
the lowest layer is configured to receive the current feed-forward information comprising a current time series value; and
the lowest layer is configured to provide the current feedback information comprising a predicted future time series value.

13. The apparatus of claim 9, wherein each layer other than the lowest layer is configured to delay the current feed-forward information from the lower layer or the computational network input to generate the past feed-forward information for that layer.

14. The apparatus of claim 9, wherein the computational network further comprises multiple pooling units, each pooling unit configured to receive the current feed-forward information from the lower layer or the computational network input, each pooling unit further configured to reduce a dimensionality or increase a transformation-invariance of the current feed-forward information.

15. The apparatus of claim 9, wherein the at least one processing device is further configured to train the encoder and the decoder of each layer.

16. The apparatus of claim 15, wherein:
the computational network further comprises multiple delay units; and
to train the encoder and the decoder of each layer, the at least one processing device is configured to:
forward-propagate training data through the encoders and the delay units for each of multiple time steps;
back-propagate the training data through the decoders for each of the time steps;
update the encoders and the decoders to improve their reproduction of the training data across the time steps; and
apply post-processing to the encoders and the decoders.

17. A non-transitory computer readable medium containing instructions that, when executed by at least one processing device, cause the at least one processing device to:
 learn and predict time-series data using a computational network, the computational network comprising multiple layers including a highest layer, a lowest layer, and one or more intermediate layers, each of the multiple layers comprising an encoder and a decoder;
 wherein the encoder of each layer other than the highest layer is configured to multiplicatively combine (i) current feed-forward information from a lower layer or a computational network input and (ii) past feedback information from a higher layer, the encoder of each layer other than the highest layer configured to generate current feed-forward information for the higher layer;
 wherein the decoder of each layer other than the lowest layer is configured to multiplicatively combine (i) current feedback information from the higher layer and (ii) at least one of the current feed-forward information from the lower layer or the computational network input or past feed-forward information from the lower layer or the computational network input, the decoder of each layer other than the lowest layer configured to generate current feedback information for the lower layer or a computational network output; and
 wherein each layer other than the highest layer is configured to receive the current feedback information from the decoder of the higher layer and delay the current feedback information for a predetermined amount of time greater than zero to generate the past feedback information for that layer before the past feedback information is provided to the encoder of that layer.

18. The non-transitory computer readable medium of claim 17, wherein:
 each layer other than the highest layer is configured to send its current feed-forward information to a next-higher layer; and
 each layer other than the lowest layer is configured to send its current feedback information to a next-lower layer.

19. The non-transitory computer readable medium of claim 18, wherein:
 the highest layer is configured to use its current feed-forward information as its current feedback information; and
 the lowest layer is configured to send its current feedback information to the computational network output.

20. The non-transitory computer readable medium of claim 18, wherein:
 the lowest layer is configured to receive the current feed-forward information comprising a current time series value; and
 the lowest layer is configured to provide the current feedback information comprising a predicted future time series value.

21. The non-transitory computer readable medium of claim 17, wherein each layer other than the lowest layer is configured to delay the current feed-forward information from the lower layer or the computational network input to generate the past feed-forward information for that layer.

22. The non-transitory computer readable medium of claim 17, wherein the computational network further comprises multiple pooling units, each pooling unit configured to receive the current feed-forward information from the lower layer or the computational network input, each pooling unit further configured to reduce a dimensionality or increase a transformation-invariance of the current feed-forward information.

23. The non-transitory computer readable medium of claim 17, further containing instructions that, when executed by the at least one processing device, cause the at least one processing device to train the encoder and the decoder of each layer.

24. The non-transitory computer readable medium of claim 23, wherein:
 the computational network further comprises multiple delay units; and
 the instructions that when executed cause the at least one processing device to train the encoder and the decoder of each layer comprise instructions that when executed cause the at least one processing device to:
 forward-propagate training data through the encoders and the delay units for each of multiple time steps;
 back-propagate the training data through the decoders for each of the time steps;
 update the encoders and the decoders to improve their reproduction of the training data across the time steps; and
 apply post-processing to the encoders and the decoders.

* * * * *